Figure 1:
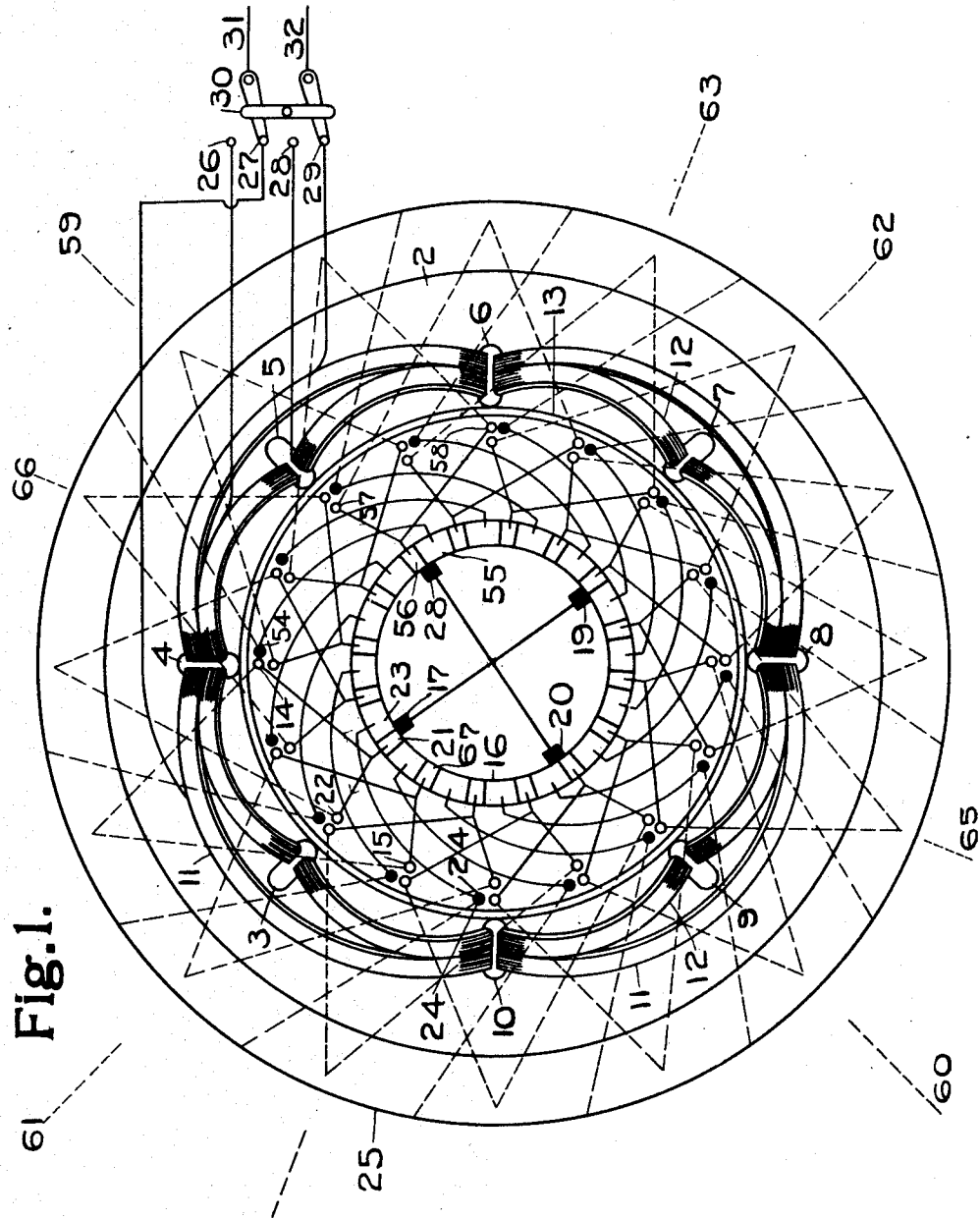

V. A. FYNN.
ALTERNATING CURRENT MOTOR.
APPLICATION FILED APR. 12, 1915.

1,213,617.

Patented Jan. 23, 1917.
2 SHEETS—SHEET 1.

WITNESS

INVENTOR
V. A. Fynn
BY
ATTORNEY

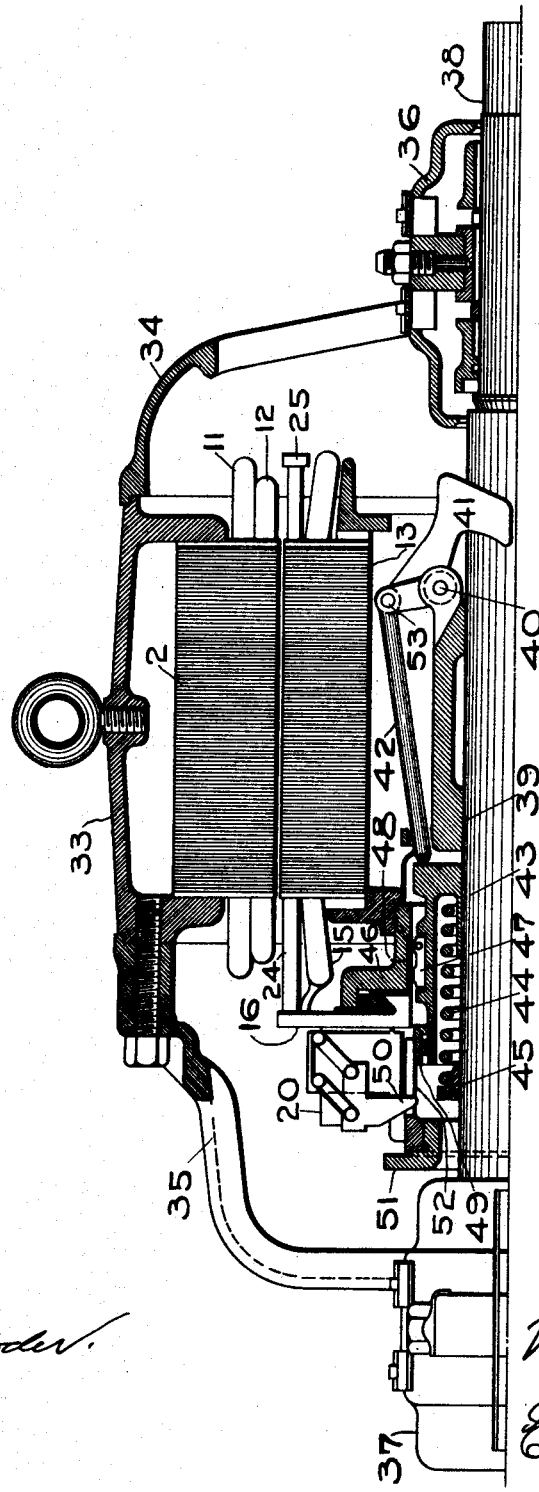

UNITED STATES PATENT OFFICE.

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,213,617. Specification of Letters Patent. Patented Jan. 23, 1917.

Application filed April 12, 1915. Serial No. 20,716.

*To all whom it may concern:*

Be it known that I, VALÈRE ALFRED FYNN, a subject of the King of England, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates more particularly to single-phase asynchronous induction motors having a shunt characteristic and capable of being operated at a plurality of speeds, the several speeds being obtained either by providing the stator with a plurality of windings, each producing a different number of poles, or by so arranging a single winding on the stator that the connections of its elements can be reorganized to successively produce different numbers of poles.

The objects of my invention are to provide a machine of the type described which will have good starting characteristics and, particularly, one which will readily attain the higher speeds for which it is designed.

A further object is to provide a simple and efficient arrangement whereby the rotor copper will be utilized to good advantage in normal operation at each of the speeds for which the machine is designed.

In carrying out my invention, I provide the rotor with a commutator; brushes coöperating therewith; a commuted winding connected to some segments of said commutator; another winding, the elements of which are all connected to a common conductor at one end and to other segments of said commutator at the other end; and with a short-circuiting device for the commutator. I so select the pitch or step of the commuted winding and so dispose the brushes on the commutator that the commuted winding will be capable of coöperating with one of the numbers of poles which the stator can produce, for the purpose of starting the machine as a commutator motor, and I prefer to so select this pitch that, when this winding is short-circuited by means of the short-circuiting device above referred to, it becomes inductively responsive to any of the numbers of poles the stator can produce. I arrange the other rotor winding so that, at starting, it is not within itself (i. e., without the coöperation of brushes) inductively responsive to that number of stator poles with which the commuted winding coöperates at starting but so that it can be made inductively responsive to any of the numbers of poles the stator can produce by short-circuiting the commutator, and generally prefer to so set the short-circuiting device that it will conductively interconnect or short-circuit all of the commutator segments just before the rotor reaches the synchronous speed corresponding to the greatest number of poles available in the stator.

My preferred mode of operating the machine is to produce, at starting, the smallest available number of poles in the stator and to cause the machine to reach a speed approximating its lowest synchronous speed for the largest number of stator poles as a commutator motor. The short-circuiting device is then set to operate when this speed had been attained and transforms the machine into an asynchronous induction motor which will continue to increase its speed without any change of connections being necessary until it has reached the highest speed attainable with the number of poles being produced in the stator. It is clear that this machine will reach its highest speed more readily and more certainly than one in which it is necessary to reorganize the stator connections after the lowest synchronous speed has been attained, for such a reorganization makes it necessary to temporarily disconnect the motor from the mains. In case the machine is designed for more than two speeds, it will often be more convenient to start the machine with an intermediate number of poles in the stator, and to so dispose the brushes on the commutator, and to so select the step of the commuted winding that the latter will coöperate with the selected number of poles to start the machine as a commutator motor. It may sometimes be desirable to set the short-circuiting device to operate at a speed other than the lowest for which the motor is designed.

In the accompanying drawings, which illustrate one embodiment of my invention, Figure 1 diagrammatically indicates the stator and rotor windings, while Fig. 2 outlines a possible mechanical construction of the machine and particularly of the short-circuiting device coöperating with the commutator.

Referring more particularly to Fig. 1, 2 is a stator provided with the slots 3 to 10 inclusive, carrying a 4-pole winding 11 comprising four coils, each spanning two teeth and connected in series between the terminals 27 and 29, and also an 8-pole winding 12 comprising eight coils each spanning one tooth and connected in series between the terminals 26 and 28. The 2-pole switch 30 makes it possible for the mains 31, 32 to be connected either to the 4-pole or to the 8-pole stator winding. In the figure, these mains are connected to the 4-pole winding. The rotor 13 carries a number of conductors such as 14, 15, 22, 57 and 58, preferably located in slots or holes in the iron laminations and forming part of the commuted winding which is connected to the narrower segments such as 21 and 56 forming a part of the commutator 16. This rotor winding is of the parallel or lap type, and its step or pitch is so chosen that it will coöperate with either of the stator windings when totally short-circuited or when current is directed therethrough by suitably disposed brushes. In this case the pitch of the 8-pole stator winding embraces 45 degrees while that of the 4-pole stator winding embraces 90 degrees. The step of the commuted rotor winding has been chosen, by way of example, to embrace about 67½ degrees, as may be seen by following one element or coil of the commuted winding such as that connected between the segments 21 and 67 and comprising the conductors 14 and 15. The full lines, leading to the conductors of the commuted winding, represent the front connections, and the dotted lines represent the back connections of the rotor. In the example shown, the motor is arranged to start as a 4-pole series induction machine with rotor excitation, commonly termed a "repulsion" motor, and the commuted rotor winding is, therefore, short-circuited by means of brushes, along the axes 63, 64, 65, 66, displaced from the axes 59, 60, 61 and 62 of the 4-pole magnetization produced by the stator. Because the rotor winding is of the parallel and not of the series type, a brush is provided for each of the four poles produced by the stator. Brushes of the same polarity, such as 17, 19, are interconnected and are also connected to the brushes of opposite polarity, such as 20, 28. Elements of the other rotor winding are located in the same slots with the commuted winding and, in this example, consist of single conductors, such as 24 and 54, shown by means of full circles in the figure, so as to distinguish them from the conductors forming a part of the commuted winding. These conductors 24, 54, and the like, are all connected at one end of the rotor to the short-circuiting ring 25, while their other ends are connected to the larger segments, such as 23 and 55, forming part of the commutator 16.

The system of windings described coöperates with the short-circuiting and brush controlling device illustrated in Fig. 2, which also shows a possible general arrangement of a machine of this kind. The shaft 38 carries the rotor 13 and is supported in bearings 36 and 37 attached to end plates 34, 35, centered on a frame 33 supporting the stator laminations 2 within which are embedded the stator windings 11, 12. The commutator 16 is of the vertical face type and is held in a casting 46 attached to the spider 39 keyed to the shaft and supporting the rotor laminations 13. This casting 46 carries an annular conducting sleeve 48, bored out to the same inner diameter as the commutator 16 but normally insulated from the latter. One of the brushes 20, coöperating with the commutator 16, is shown in this figure and is held in contact with the vertical face of the commutator by means of a spring controlled clamp provided with the projection, or nose 50, reaching through a slot 52 provided in the brush holder support 51. A sleeve 43, capable of longitudinal motion along the shaft 38, carries a large number of loosely mounted short-circuiting elements 47 located in a groove provided in said sleeve and normally so positioned that they can only make contact with the conductive sleeve 48 but not with the commutator 16. This sleeve and the short-circuiting elements 47 are held in this position by means of a coil spring 44 resting against a nut 45 screwed and locked on the shaft 38, and by means of which the tension of the spring 44 can be adjusted. This sleeve 43 and the short-circuiting elements 47 are also under the control of weights 41 hinged on a pin 40 attached to the spider 39, the movement of said weights being transmitted to the sleeve 43 by means of rods 42 loosely connected to the weights 41 by means of pins 53.

Referring to the operation of the short-circuiting device; as long as the spring 44 is in control of the sleeve 43, the relative positions of the inner face of the commutator 16, the inner face of the conducting sleeve 48 insulated from that commutator, and of the short-circuiting elements 47, are as shown in the figure. But, as soon as the rotor has reached a sufficient speed, the weights 41 are thrown upward, away from the center of the shaft by centrifugal force, and, since they pivot on the pins 40, they force the rods 42 from right to left in a direction opposed to the pressure exerted by the spring 44. As soon as this spring is overpowered, the sleeve 43 and, with it, the short-circuiting elements 47 move to the left and into such a position as to make electrical connection between the inner face of the commutator and the inner face of the conducting tube 48, good contact between the short-circuiting elements 47, the tube, and the inner face of the commutator being, in part, secured by centrifugal force, which tends to throw the elements 47 out of the groove in the sleeve 43 in which they are located and presses them hard against the inner commutator face and the tube 48, thus totally short-circuiting all the commutator segments and, therefore, the commuted rotor winding, as well as all of the squirrel cage bars, such as 54 and 24. This same movement of the sleeve 43 forces the projection 49 thereof into engagement with the nose 50 of the spring-controlled clamp holding the brush in contact with the vertical commutator face, pushes this nose upward and to the left, or away from the commutator, and thus breaks contact between the brushes and the vertical commutator face.

One mode of operation of the machine as a whole is as follows: The spring 44 and the weights 41 are so adjusted that all the segments of the commutator 16 will be totally short-circuited in the manner above described just before the machine reaches the lowest speed for which it is designed. When it is desired to start the motor, the switch 30 is placed in the position shown, thus producing the smallest number of poles in the stator. The brushes coöperating with the commutator 16 are permanently located so as to give the desired torque when the switch 30 is in the position shown. Under these conditions, the motor will start in a manner now well understood and, as soon as its speed reaches the neighborhood of the synchronous corresponding to the largest number of poles for which the stator is designed, the short-circuiting device will operate to convert the commuted winding into a short-circuited pole winding and connect the rest of the conductors located on the rotor so as to form a true squirrel cage and will also force the brushes off the commutator face. From this instant, and without it being necessary to temporarily disconnect the motor from the supply, thus possibly bringing it to a standstill, the machine will continue to accelerate, but will now operate as an asynchronous induction motor with totally short-circuited rotor, and not as a commutator machine, and will thus reach the higher speed corresponding to the number of poles being produced by the stator. When it is desired to drop from a higher to a lower speed, it is convenient to interrupt the stator circuits for a time sufficient to allow the speed to reach the neighborhood of the synchronous corresponding to the higher number of poles, and then to close the stator switch in such a way as to produce that higher number of poles. It will be understood that by "pole winding" I refer to a winding which is composed of a number of coils having at least one turn and a pitch of the same order of magnitude as a stator pole pitch.

In the embodiment of my invention shown in Fig. 1, I have so connected the squirrel cage bars to the wider commutator segments forming part of the commutator 16, that the machine will start even though the connections between the brushes 17, 19, 20 and 28 are omitted. Assuming that the direction of the currents induced in the commuted winding at starting are such that, at a given instant, they tend to flow from conductors 57 and 58 to segment 56, then they will tend to flow from segment 21 to conductors 14 and 22. They will be able to do this in the ordinary way by means of the external connections between the brushes 17 and 28; but, in the example shown in Fig. 1, this circuit may also be closed through some of the squirrel cage bars. Thus, starting from the segment 56, this circuit can be closed by way of the brush 28, the segment 55, the squirrel cage conductor 54, the short-circuiting ring 25, the squirrel cage conductor 24, the wide segment 23, the brush 17 and the narrow segment 21. It will further be noted that if this circuit is so closed, then the current through the squirrel cage conductors 54 and 24 will be in the right direction to contribute to the torque of the machine. This explanation shows that the manner in which the squirrel cage conductors are connected to the commutator has an effect on the starting performance of the machine because the brushes used at starting interconnect the two rotor windings and it is, therefore, preferable to so make this connection that any current which may circulate in said conductors at starting will add to rather than detract from the starting torque of the machine. The width of the brushes 17, 19, 20 and 28 will, in practice, be such as to at least cover one narrow and one wide segment. In the machine shown in Fig. 1, the second rotor winding is entirely open-circuited as long as no brushes are applied to the commutator and is, therefore, not within itself inductively responsive to the 4-pole magnetization produced by the stator at starting.

In normal operation, that is, with totally short-circuited commutator, the squirrel cage copper will be utilized to the fullest possible extent, while the copper in the commuted winding, now converted into a short-circuited pole-winding, will, as a rule, not be quite fully utilized, because its pitch or step cannot bear the best possible relation to each of the numbers of poles for which the stator can be connected. In order, therefore, to make the best possible use of the total rotor copper, in normal operation, it is best to place the greater part of said copper into the squirrel cage, using wire of small cross-section for the commuted winding. This has the additional advantage of improving the starting conditions by increasing the rotor resistance at the time when the machine operates as a commutator motor. Supposing that two-thirds of the total copper is located in the squirrel cage and one third of it in the commuted winding, then the total efficiency of the rotor, in normal operation, will be as high as 92 per cent., even though only 75 per cent. of the commuted winding copper is effective. It is to take care of this condition that I have made those commutator segments which are connected to the squirrel cage bars so much wider than those connected to the commuted winding. This arrangement will distribute the heavier current circulating through the squirrel cage bars over a larger number of the short-circuiting elements 47, thus preventing undue heating.

I can also operate the machine with the spring 44 and the weights 41 of the short-circuiting device adjusted to totally short-circuit the commutator 16 at some speed above the lowest for which the machine is designed, for instance, just before the machine reaches the synchronous speed corresponding to the smallest number of stator poles. In such case, it is also necessary to so dimension the short-circuiting device that it will not break the short-circuit until the motor speed falls below the lowest for which the machine is designed and which, of course, corresponds to the greatest number of poles. This is very easy to accomplish as the difference between the pull in and the pull out speeds of such devices is naturally great and increases as their action is made more positive and more snappy. With this setting of the short-circuiting device and the stator connected to produce the smallest number of stator poles, as before, the machine will run up to its highest speed as a commutator motor. In order to cause the machine to run at any of its lower speeds, it is only necessary to interrupt the stator connections for a short time and reorganize them to correspond with the desired speed. In some cases, it will be convenient to set the short-circuiting device to operate at an intermediate speed, say at that corresponding to six stator poles in a machine adapted to run with 4, 6 and 8 poles.

For the sake of a clear illustration of my invention, I have shown only eight stator and sixteen rotor slots. It is obvious, in practice, that the number of slots in both members should be considerably larger and that the width of each brush is preferably such as to always contact with two commutator segments connected to the commuted winding.

While I have illustrated my invention as applied to a stator capable of producing two sets of poles, namely four and eight, yet it is by no means restricted to such a combination and can be used in a motor, the stator of which is adapted to produce more than two sets of poles. While it is convenient to make provision for withdrawing the brushes from contact with the commutator after the rotor winding has been short-circuited, yet it is by no means necessary to do so.

Having fully described my invention, what I claim as new and desire to secure by Letters-Patent of the United States is:

1. In an alternating current motor, the combination of means for successively producing different numbers of stator poles, a rotor provided with a commuted winding, elements of a second rotor winding interconnected at one end, and means for interconnecting the other ends of said elements.

2. In an alternating current motor, the combination of means for successively producing different numbers of stator poles, a rotor provided with a commuted winding, elements of a second rotor winding interconnected at one end, and automatic means for interconnecting the other ends of said elements when a speed has been attained approximating the synchronous speed for one of the available numbers of stator poles.

3. In an alternating current motor, the combination of means for successively producing different numbers of stator poles, a rotor provided with a commuted winding, elements of a second rotor winding interconnected at one end, and means for interconnecting the other ends of said elements and short-circuiting the commuted winding at a plurality of points.

4. In an alternating current motor, the combination of means for successively producing different numbers of stator poles, a rotor provided with a commuted winding, elements of a second rotor winding interconnected at one end, and single means for interconnecting the other ends of said elements and short-circuiting the commuted winding at a plurality of points.

5. In an alternating current motor, the combination of means for successively producing different numbers of stator poles, a rotor provided with a commuted winding and brushes positioned to cause it to coöperate with a number of stator poles less than the largest number available, elements of a second winding on the rotor, and automatic means for interconnecting said elements to form a squirrel cage winding when a speed has been attained approximating the synchronous speed for one of the available numbers of stator poles.

6. In an alternating current motor, the combination of means for successively producing different numbers of stator poles, a rotor provided with a commuted winding and brushes positioned to cause it to coöperate with one of the available number of stator poles, elements of a second winding on the rotor, said elements being all interconnected at one end and not inductively responsive to the number of stator poles with which the brushes are positioned to coöperate, and means for interconnecting the other ends of said elements.

7. In an alternating current motor, the combination of means for successively producing different numbers of stator poles, a rotor, a commutator, a winding on the rotor connected to said commutator and having a pitch larger than the pitch of the smallest number of available stator poles and smaller than that of the largest number of available stator poles, brushes positioned on the commutator to enable the commuted winding to coöperate with a smaller number of stator poles than the largest number available, elements of a second winding on the rotor, said elements being all interconnected at one end and not inductively responsive to the number of stator poles with which the brushes are positioned to coöperate, and means for interconnecting the other ends of said elements.

8. In a dynamo electric machine, a rotor provided with a commutator and a commuted winding connected to some of the commutator segments, a second winding on the rotor having its elements interconnected at one end and the other ends of said elements connected to segments of the commutator other than those to which the commuted winding is connected, and means for short-circuiting the commutator.

9. The method of operating a multiple speed alternating current motor having means for successively producing different numbers of stator poles and a rotor provided with a commuted winding and with brushes positioned to cause said winding to coöperate with a number of stator poles less than the largest number available, which comprises producing at starting less than the largest number of available stator poles, short-circuiting the commuted winding when a speed has been attained approximating the synchronous for one of the available numbers of stator poles, and varying the number of stator poles to vary the speed.

10. The method of operating a multiple speed alternating current motor having means for successively producing different numbers of stator poles and a rotor provided with a commuted winding and with brushes positioned to cause said winding to coöperate with the smallest number of stator poles, which comprises producing at starting the smallest number of available stator poles, short-circuiting the commuted winding when a speed has been attained approximating the synchronous for one of the available numbers of stator poles, and varying the number of stator poles to vary the speed.

11. The method of operating a multiple speed alternating current motor having means for successively producing different numbers of stator poles and a rotor provided with a commuted winding and with brushes positioned to cause said winding to coöperate with a number of stator poles less than the largest number available, said rotor being also provided with a second winding having its elements interconnected at one end, which comprises producing at starting less than the largest number of available stator poles, interconnecting the other ends of the elements of the second rotor winding when a speed has been attained approximating the synchronous speed for one of the available numbers of stator poles, and varying the number of stator poles to vary the speed.

12. The method of operating a multiple speed alternating current motor having means for successively producing different numbers of stator poles, and a rotor provided with a commuted winding and with brushes positioned to cause said winding to coöperate with a number of stator poles less than the largest number available, which comprises producing at starting less than the largest number of available stator poles, short-circuiting the commuted winding when a speed has been attained approximating the synchronous for the number of poles produced at starting, and varying the number of stator poles to vary the speed.

13. In an alternating current motor, the combination of means for successively producing different numbers of stator poles, and a rotor provided with a commuted winding and a second winding open circuited at starting, the combined cross-section of the conductors of said second winding being greater than the combined cross-section of the conductors of the commuted winding.

In testimony whereof, I have hereunto set my hand and affixed my seal.

VALÈRE ALFRED FYNN. [L. s.]

Witness:
W. A. ALEXANDER.

Copies of this patent may be obtained for five cents each, by addressing the "Commissioner of Patents, Washington, D. C."